United States Patent
Demirors et al.

(10) Patent No.: US 9,714,326 B2
(45) Date of Patent: Jul. 25, 2017

(54) PROCESS FOR INCREASING THE MELT STRENGTH OF A POLYETHYLENE RESIN, A MASTERBATCH COMPOSITION AND A POLYMERIC COMPOSITION

(71) Applicant: Dow Global Technologies LLC, Midland, MI (US)

(72) Inventors: Mehmet Demirors, Pearland, TX (US); Sean W. Ewart, Pearland, TX (US); Teresa P. Karjala, Lake Jackson, TX (US); Maria Pollard, Pearland, TX (US)

(73) Assignee: Dow Global Technologies LLC, Midland, WI (US)

( * ) Notice: Subject to any disclaimer, the term of this patent is extended or adjusted under 35 U.S.C. 154(b) by 0 days.

(21) Appl. No.: 15/023,673

(22) PCT Filed: Sep. 18, 2014

(86) PCT No.: PCT/US2014/056199
§ 371 (c)(1),
(2) Date: Mar. 21, 2016

(87) PCT Pub. No.: WO2015/047841
PCT Pub. Date: Apr. 2, 2015

(65) Prior Publication Data
US 2016/0237222 A1    Aug. 18, 2016

Related U.S. Application Data

(60) Provisional application No. 61/884,551, filed on Sep. 30, 2013.

(51) Int. Cl.
| | |
|---|---|
| *C08J 3/22* | (2006.01) |
| *C08K 5/14* | (2006.01) |
| *C08L 23/06* | (2006.01) |
| *C08L 23/08* | (2006.01) |
| *C08K 5/00* | (2006.01) |

(52) U.S. Cl.
CPC ............... *C08J 3/226* (2013.01); *C08K 5/14* (2013.01); *C08L 23/06* (2013.01); *C08L 23/0815* (2013.01); *C08J 2323/06* (2013.01); *C08J 2423/06* (2013.01); *C08K 5/0025* (2013.01); *C08L 2205/025* (2013.01); *C08L 2205/06* (2013.01); *C08L 2310/00* (2013.01)

(58) Field of Classification Search
CPC .... C08J 3/226; C08J 2323/06; C08J 2423/06; C08K 5/14; C08K 5/0025; C08L 23/04; C08L 23/06; C08L 2205/025; C08L 2310/00; C08F 2810/06; C08F 2810/10
See application file for complete search history.

(56) References Cited

U.S. PATENT DOCUMENTS

| | | |
|---|---|---|
| 4,578,431 A | 3/1986 | Shaw et al. |
| 4,614,764 A | 9/1986 | Colombo et al. |
| 4,737,547 A | 4/1988 | White |
| 4,798,071 A | 1/1989 | Staat et al. |
| 5,089,321 A | 2/1992 | Chum et al. |
| 6,114,486 A | 9/2000 | Rowland |

FOREIGN PATENT DOCUMENTS

| | | |
|---|---|---|
| EP | 0072750 | 2/1983 |
| WO | WO9914271 | 3/1999 |
| WO | WO2013101767 | 7/2013 |

OTHER PUBLICATIONS

EP Office Action dated May 9, 2016; from EP counterpart Application No. 14780974.3.
PCT Search Report dated Jan. 5, 2015; from PCT counterpart Application No. PCT/US2014/056199.
PCT IPRP dated Apr. 5, 2016; from PCT counterpart Application No. PCT/US2014/056199.
EP Response to Office Action received Nov. 21, 2016; from EP counterpart Application No. 14780974.3.

*Primary Examiner* — Nathan M Nutter
(74) *Attorney, Agent, or Firm* — Husch Blackwell LLP

(57) ABSTRACT

A process for increasing the melt strength of a polyethylene resin comprising a) selecting a polyethylene resin having i) a density, as determined according to ASTM D792, in the range of from 0.865 g/cm³ to 0.97 g/cm³, and ii) a melt index, $I_2$, as determined according to ASTM D1238 (2.16 kg, 190° C.), in the range of from 0.01 g/10 min to 100 g/10 min; b) reacting from 10 ppm to 1000 ppm of at least one peroxide having a 1 hour half-life decomposition temperature from 160° C. to 250° C. with the polyethylene resin under conditions sufficient to increase the melt strength of the polyethylene resin is provided. Also provided are a masterbatch composition and a polymeric composition.

4 Claims, No Drawings

US 9,714,326 B2

PROCESS FOR INCREASING THE MELT STRENGTH OF A POLYETHYLENE RESIN, A MASTERBATCH COMPOSITION AND A POLYMERIC COMPOSITION

FIELD OF INVENTION

The instant invention relates to a process for increasing the melt strength of a polyethylene resin, a masterbatch composition and a polymeric composition.

BACKGROUND OF THE INVENTION

Polyethylene resins may need enhanced melt strength for certain applications. For example, linear low density polyethylene (LLDPE) typically does not have sufficient melt strength to produce thick blown films. LLDPE melt strength may be increased, for example, by blending the LLDPE with a low density polyethylene (LDPE). Alternatively, LLDPE melts strength may be increased by increasing the molecular weight of the LLDPE. Such solutions however present challenges. For example, LDPE is in short supply in certain geographic regions. Furthermore, higher molecular weight LLDPE are more difficult to process. Therefore, an alternative method to enhance polyethylene resin melt strength would be useful.

SUMMARY OF THE INVENTION

The instant invention is a process for increasing the melt strength of a polyethylene resin, a masterbatch compositions and a polymeric composition.

In one embodiment, the instant invention provides a process for increasing the melt strength of a polyethylene resin comprising a) selecting a polyethylene resin having i) a density, as determined according to ASTM D792, in the range of from 0.865 g/cm$^3$ to 0.97 g/cm$^3$, and ii) a melt index, $I_2$, as determined according to ASTM D1238 (2.16 kg, 190° C.), in the range of from 0.01 g/10 min to 100 g/10 min; b) reacting from 10 ppm to 1000 ppm of at least one peroxide having a 1 hour half-life decomposition temperature from 160° C. to 250° C. with the polyethylene resin under conditions sufficient to increase the melt strength of the polyethylene resin.

DETAILED DESCRIPTION OF THE INVENTION

The instant invention is a process for increasing the melt strength of a polyethylene resin, a masterbatch compositions and a polymeric composition.

The process according to the present invention comprises a) selecting a polyethylene resin having i) a density, as determined according to ASTM D792, in the range of from 0.865 g/cm$^3$ to 0.97 g/cm$^3$, and ii) a melt index, $I_2$, as determined according to ASTM D1238 (2.16 kg, 190° C.), in the range of from 0.01 g/10 min to 100 g/10 min; b) reacting from 10 ppm to 1000 ppm of at least one peroxide having a 1 hour half-life decomposition temperature from 160° C. to 250° C. with the polyethylene resin under conditions sufficient to increase the melt strength of the polyethylene resin. In one embodiment of the process, the at least one peroxide is added to the polyethylene resin as a masterbatch comprising the at least one peroxide along with a carrier resin.

In an alternative embodiment, the instant invention further provides a masterbatch composition comprising: a carrier resin; and from 1000 ppm to 10000 ppm of at least one peroxide having a 1 hr. half-life decomposition temperature from 160° C. to 250° C.

In another alternative embodiment, the instant invention further provides polymeric composition comprising: from 1 to 30 wt % of the masterbatch which comprises a carrier resin and from 1000 ppm to 10000 ppm of at least one peroxide having a 1 hr. half-life decomposition temperature from 160° C. to 250° C.; from 70 to 99 wt % polyethylene resin having a density, as determined according to ASTM D792, in the range of from 0.865 g/cm$^3$ to 0.97 g/cm$^3$, and a melt index, $I_2$, as determined according to ASTM D1238 (2.16 kg, 190 C.), in the range of from 0.01 g/10 min to 100 g/10 min; and optionally, from 500 to 2000 ppm secondary antioxidant based on the total polymeric composition weight.

Any polyethylene resin having a density, as determined according to ASTM D792, in the range of from 0.865 g/cm$^3$ to 0.97 g/cm$^3$, and a melt index, $I_2$, as determined according to ASTM D1238 (2.16 kg, 190 C.), in the range of from 0.01 g/10 min to 100 g/10 min may be used in the invention.

The polyethylene resin may be any ethylene-based resin having such density and $I_2$. Such polyethylene resins include polyethylene homopolymers, copolymers and interpolymers, each case in which at least 50 percent by weight of the polymer is derived from ethylene. As used herein, copolymer means a polymer having units derived from two different monomers and interpolymer means a polymer having units derived from three or more different monomers. In one embodiment the polyethylene resin has a density from 0.870 to 0.965 g/cc and an $I_2$ from 0.1 to 25 g/10 min. All individual values and subranges from 0.870 to 0.965 g/cc are included herein and disclosed herein; for example, the density of the polyethylene resin can be from a lower limit of 0.87, 0.89, 0.91, 0.93, or 0.95 g/cc to an upper limit of 0.88, 0.9, 0.92, 0.94 or 0.965 g/cc. For example, the polyethylene resin density may be in the range from 0.870 to 0.965 g/cc, or in the alternative, the polyethylene resin density may be in the range from 0.9 to 0.965 g/cc, or in the alternative, the polyethylene resin density may be in the range from 0.870 to 0.9 g/cc, or in the alternative, the polyethylene resin density may be in the range from 0.885 to 0.945 g/cc. All individual values and subranges of an $I_2$ from 0.1 to 25 g/10 min are included herein and disclosed herein; for example the $I_2$ of the polyethylene resin can be from a lower limit of 0.1, 1, 5, 10, 15, or 20 g/10 min to an upper limit of 0.5, 3, 8, 13, 18, 21 or 25 g/10 min. For example, the $I_2$ of the polyethylene resin may be in the range from 0.1 to 25 g/10 min, or in the alternative, the $I_2$ of the polyethylene resin may be in the range from 7 to 25 g/10 min, or in the alternative, the $I_2$ of the polyethylene resin may be in the range from 0.1 to 10 g/10 min, or in the alternative, the $I_2$ of the polyethylene resin may be in the range from 5 to 15 g/10 min. In a particular embodiment, the polyethylene resin has a density from 0.915 to 0.934 g/cc and an $I_2$ from 0.1 to 20 g/10 min.

In another particular embodiment, the polyethylene resin has an $I_{21}$ from 1 to 100 g/10 min and a density from 0.945 to 0.967 g/cc. All individual values and subranges of an $I_{21}$ from 1 to 100 g/10 min are included herein and disclosed herein; for example, the $I_{21}$ can be from a lower limit of 1, 10, 20, 30, 40, 50, 60, 70 80 or 90 g/10 min to an upper limit of 5, 15, 25, 35, 45, 55, 65, 75, 95 or 100 g/10 min. For example, the $I_{21}$ of the polyethylene resin may be in the range from 1 to 100 g/10 min, or in the alternative, the $I_{21}$ of the polyethylene resin may be in the range from 1 to 50 g/10 min, or in the alternative, the $I_{21}$ of the polyethylene resin may be in the range from 50 to 100 g/10 min, or in the alternative, the $I_{21}$ of the polyethylene resin may be in the range from 25 to 80 g/10 min, or in the alternative, the $I_{21}$ of the polyethylene resin may be in the range from 15 to 75 g/10 min. All individual values and subranges of the density from 0.945 to 0.967 g/cc are included herein and disclosed herein; for example, the density of the polyethylene resin may be from a lower limit of 0.945, 0.955, or 0.965 g/cc to an upper limit of 0.95, 0.96 or 0.967 g/cc.

The polyethylene resin may be made by any acceptable process, including for example, gas phase, slurry, or solution polymerization processes.

In another embodiment, the polyethylene resin comprises one or more of any of the foregoing polymers. Examples of polyethylene resins include DOWLEX, AFFINITY/ENGAGE, ELITE, ATTANE and ELITE AT, all of which are commercially available from The Dow Chemical Company and ENABLE and EXCEED, all of which are commercially available from ExxonMobil Chemical Company.

The polyethylene resin has an $I_2$ from 0.01 g/10 min to 100 g/10 min. All individual values and subranges from 0.01 g/10 min to 100 g/10 min are included herein and disclosed herein; for example the $I_2$ can be from a lower limit of 0.01, 0.1, 1, 10, 20, 30, 40, 50, 60, 70, 80 or 90 g/10 min to an upper limit of 0.05, 0.5, 5, 15, 25, 35, 45, 55, 65, 75, 85, 95 or 100 g/10 min. For example, the polyethylene resin $I_2$ may be in the range of from 0.01 g/10 min to 100 g/10 min, or in the alternative, the polyethylene resin $I_2$ may be in the range of from 0.01 g/10 min to 10 g/10 min, or in the alternative, the polyethylene resin $I_2$ may be in the range of from 25 g/10 min to 100 g/10 min, or in the alternative, the polyethylene resin $I_2$ may be in the range of from 1 g/10 min to 25 g/10 min, or in the alternative, the polyethylene resin $I_2$ may be in the range of from 5 g/10 min to 50 g/10 min.

From 10 ppm to 1000 ppm of at least one peroxide having a 1 hour half-life decomposition temperature from 160° C. to 250° C. is reacted with the polyethylene resin. All individual values and subranges from 10 to 1000 ppm are included herein and disclosed herein; for example, the amount of total peroxide can be from a lower limit of 10, 50, 100, 200, 300, 400, 500, 600, 700, 800 or 900 ppm to an upper limit of 15, 75, 150, 250, 350, 450, 550, 650, 750, 850, 950 or 1000 ppm. For example, the amount of total peroxide reacted with the polyethylene resin may be in the range of from 10 to 1000 ppm, or in the alternative, the amount of total peroxide reacted with the polyethylene resin may be in the range of from 10 to 500 ppm, or in the alternative, the amount of total peroxide reacted with the polyethylene resin may be in the range of from 500 to 1000 ppm, or in the alternative, the amount of total peroxide reacted with the polyethylene resin may be in the range of from 10 to 300 ppm, or in the alternative, the amount of total peroxide reacted with the polyethylene resin may be in the range of from 20 to 100 ppm.

Any peroxide having a 1 hour half-life decomposition temperature from 160° C. to 250° C. may be used in embodiments of the invention. All individual value and subranges from 160 to 250° C. are included herein and disclosed herein; for example, the 1 hour half-life decomposition temperature can be from a lower limit of 160, 170, 180, 190, 200, 210, 220, 230, or 240° C. to an upper limit of 165, 175, 185, 195, 205, 215, 225, 235, 245 or 250° C. For example, the 1 hour half-life decomposition temperature can be in the range from 160° C. to 250° C., or in the alternative, the 1 hour half-life decomposition temperature can be in the range from 200° C. to 250° C., or in the alternative, the 1 hour half-life decomposition temperature can be in the range from 200° C. to 250° C., or in the alternative, the 1 hour half-life decomposition temperature can be in the range from 180° C. to 230° C.

Exemplary peroxides include 3,3,5,7,7-pentamethyl-1,2,4 trioxepane, cumyl hydroperoxide, tert-butyl hydroperoxide or tert-amyl hydroperoxide. In a particular embodiment, more than one peroxide is used in any of the embodiments of the invention disclosed herein. For example, a combination of one peroxide having a 1 hour half-life temperature of about 170° C. and a second peroxide having a 1 hour half-life temperature of about 220° C. could be used.

The carrier resin can be any resin in which the peroxide is soluble. Such resins include, for example, ethylene-based polymers. In an alternative embodiment, the instant invention provides a process, masterbatch composition and polymeric composition, in accordance with any of the embodiments disclosed herein, except that the carrier resin is a polyethylene having a density from 0.865 to 0.975 g/cc and an $I_2$ from 0.1 to 25 g/10 min.

In an alternative embodiment, the instant invention provides a process, masterbatch composition and polymeric composition, in accordance with any of the embodiments disclosed herein, except that the carrier resin is a polyethylene having a vinyl concentration from 0.07 to 0.7 per 1,000 carbons in the backbone of the polymer. All individual values and subranges from 0.07 to 0.7 vinyls per 1,000 carbons in the backbone of the polymer are included herein and disclosed herein; for example, the vinyl content can be from a lower limit of 0.07, 0.09, 0.1, 0.3, or 0.6 vinyls per 1,000 carbons in the backbone of the polymer to an upper limit of 0.08, 0.1, 0.2, 0.4, or 0.7 vinyls per 1,000 carbons in the backbone of the polymer. For example, the vinyl concentration can range from 0.07 to 0.7 vinyls per 1,000 carbons in the backbone of the polymer, or in the alternative, the vinyl concentration can range from 0.1 to 0.7 vinyls per 1,000 carbons in the backbone of the polymer, or in the alternative, the vinyl concentration can range from 0.07 to 0.3 vinyls per 1,000 carbons in the backbone of the polymer, or in the alternative, the vinyl concentration can range from 0.1 to 0.5 vinyls per 1,000 carbons in the backbone of the polymer.

In an alternative embodiment, the instant invention provides a process, masterbatch composition and polymeric composition, in accordance with any of the embodiments disclosed herein, except that the carrier resin is free of antioxidants and free radical scavengers.

In an alternative embodiment, the instant invention provides a process, masterbatch composition and polymeric composition, in accordance with any of the embodiments disclosed herein, except that the ratio of $I_2$ of the polyethylene resin to the $I_2$ of the carrier resin is from 0.2 to 5. All individual values and subranges from 0.2 to 5 are included herein and disclosed herein; for example the ratio of $I_2$ of the polyethylene resin to the $I_2$ of the carrier resin can be from a lower limit of 0.2, 1.1, 2.2, 3.3, or 4.4 to an upper limit of 0.5, 1.5, 2.5, 3.5, 4.5 or 5. For example, the ratio of $I_2$ of the polyethylene resin to the $I_2$ of the carrier resin may be in the rag of from 0.2 to 5, or in the alternative, the ratio of $I_2$ of the polyethylene resin to the $I_2$ of the carrier resin may be in the rag of from 0.2 to 2.55, or in the alternative, the ratio of $I_2$ of the polyethylene resin to the $I_2$ of the carrier resin may be in the rag of from 2.5 to 5, or in the alternative, the ratio of $I_2$ of the polyethylene resin to the $I_2$ of the carrier resin may be in the rag of from 1.9 to 4.5.

In an alternative embodiment, the instant invention provides a process, masterbatch composition and polymeric composition, in accordance with any of the embodiments disclosed herein, except that the masterbatch is produced by mixing the at least one peroxide with the carrier resin in an extruder under mild conditions, i.e. an extruder screw design having one or more mixing elements and a series of conveying elements with barrel temperatures no greater than 250° C.

The masterbatch comprises from 1000 ppm to 10000 ppm of at least one peroxide having a 1 hr. half-life decomposition temperature from 160° C. to 250° C. All individual values and subranges from 1000 to 10000 ppm are included herein and disclosed herein; for example, the amount of peroxide in the masterbatch can be from a lower limit of 1000, 2000, 3000 or 4000 ppm to an upper limit of 1500, 2500, 3500, 4500, 5000, 6000, 7000, 8000, 9000, or 10000 ppm. For example, the amount of peroxide in the masterbatch can be in the range of from 1000 to 10000 ppm, or in the alternative, the amount of peroxide in the masterbatch can be in the range of from 2500 to 5000 ppm, or in the alternative, the amount of peroxide in the masterbatch can be in the range of from 1000 to 2500 ppm, or in the alternative, the amount of peroxide in the masterbatch can be in the range of from 3000 to 8000 ppm.

The polymeric composition optionally comprises from 500 to 2000 ppm secondary antioxidant based on the total polymeric composition weight. Secondary antioxidants prevent formation of additional free radicals by decomposing the peroxide into thermally stable, non-radical, non-reactive products by means of an efficient alternative to thermolysis and generation of free radicals. Phosphites and thioesters are examples of functionalities operating as secondary antioxidants. All individual values and subranges from 500 to 2000 ppm are included herein and disclosed herein; for example, the amount of secondary antioxidant can be from a lower limit of 500, 700, 900, 1100, 1300, 1500, 1700 or 1900 ppm to an upper limit of 600, 800, 1000, 1200, 1400, 1600, 1800 or 2000 ppm. For example, when present, the secondary antioxidant may be present in an amount from 500 to 2000 ppm, or in the alternative, the secondary antioxidant may be present in an amount from 1250 to 2000 ppm, or in the alternative, the secondary antioxidant may be present in an amount from 500 to 1250 ppm, or in the alternative, the secondary antioxidant may be present in an amount from 750 to 1500 ppm.

In one embodiment, the secondary antioxidant is present in the polyethylene resin prior to mixing with the masterbatch. In an alternative embodiment, the secondary antioxidant is a component in the masterbatch.

In an alternative embodiment, the polymeric composition exhibits an increase in melt strength at 190° C. which is at least 20% greater than the melt strength of the polyethylene resin in the absence of the masterbatch. All individual values and subranges are included herein and disclosed herein; for example the increase in melt strength can be from a lower limit of 20, 25, 30, 35 or 40% greater than the melt strength of the polyethylene resin in the absence of the masterbatch.

In yet another embodiment, the polymeric composition comprises from 1 to 30 wt % of the masterbatch, based on the total weight of the polymeric composition. All individual values and ranges from 1 to 30 wt % are included herein and disclosed herein; for example, the amount of masterbatch in the polymeric composition can be from a lower limit of 1, 5, 10, 15, 20, or 25 wt % to an upper limit of 3, 8, 13, 18, 23, 27 or 30 wt %. For example, the amount of masterbatch in the polymeric composition may range from 1 to 30 wt %, or in the alternative, the amount of masterbatch in the polymeric composition may range from 1 to 15 wt %, or in the alternative, the amount of masterbatch in the polymeric composition may range from 15 to 30 wt %, or in the alternative, the amount of masterbatch in the polymeric composition may range from 1 to 10 wt %, or in the alternative, the amount of masterbatch in the polymeric composition may range from 1 to 5 wt %, or in the alternative, the amount of masterbatch in the polymeric composition may range from 1 to 2 wt %.

The addition to the polyethylene polymer can be carried out in any customary mixing equipment in which the polymer is melted and mixed with the additives (e.g., peroxide, carrier resin or masterbatch). Suitable equipment are known to those skilled in the art, including for example, mixers, kneaders and extruders.

The process is preferably carried out in an extruder by introducing the additives during processing. Particularly preferred processing equipment are single-screw extruders, contra-rotating and co-rotating twin-screw extruders, planetary-gear extruders, ring extruders or co-kneaders. Suitable extruders and kneaders are described, for example, in Handbuch der Kunststoftextrusion, Vol 1 Grundlagen, Editors F. Hensen, W. Knappe, H. Potente, 1989, pp. 3-7, ISBN.3-446-14339-4 (Vol 2 Extrusionsanlagen 1986, ISBN 3-446-14329-7). For example, the screw length can be 1-60 times the screw diameter, preferably 35-48 times the screw diameters. The rotational speed of the screw is preferably 10-600 rotations per minute (rpm), more preferably 25-300 rpm. It is also possible to first prepare a concentrated mixture of the additive in a carrier polyethylene resin, preferably at 1000 to 10000 ppm, and then introduce this concentrate, or "masterbatch", via an extruder into a melted polyethylene resin using a static mixer to blend the two materials, preferably at 1 to 20 wt % of the concentrate in the melted resin. The concentrate can be processed in an extruder, preferably at temperatures from 180 to 240° C. The temperatures in the static mixer can range from 200 to 280° C., with a residence time in the mixer ranging from 1 to 10 minutes.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of additives is added, the additives can be premixed or added individually.

The mixed polyethylene resin and additives are subjected to a temperature above the softening point of the polymers for a sufficient period of time such that the desired changes occur. In one embodiment of the process of the present invention, the mixed polyethylene resin and additives are maintained at a temperature range no greater than 280° C. All individual values and subranges from less than or equal to 280° C. are included herein and disclosed herein. For example, the temperature can be from an upper limit of 280° C., or in the alternative, the temperature can be from an upper limit of 280, 260, 250, 240, 220, 200, 180 or 160° C. In one embodiment, the temperature is from 160° C. to 280° C. In an alternative embodiment, the temperature is from 200° C. to 260° C. It will be understood that the period of time necessary for reaction can vary as a function of the temperature, the amount of material to be reacted and the type of equipment used. Under exemplary conditions, the time at which the temperature above the softening point of the polymers is maintained may be from 10 seconds to 30 minutes. All individual values and subranges are included herein and disclosed herein; for example, the time can be from a lower limit of 10 seconds, 30 seconds, 1 minute, 5 minutes, 15, minutes or 25 minutes to an upper limit of 45 seconds, 3 minutes, 8 minutes, 18 minutes, 23 minutes or 30 minutes. For example, the time can be in the range of from 10 seconds to 30 minutes, or in the alternative, the time can be in the range of from 20 seconds to 20 minutes, or in the alternative, the time can be in the range of from 10 seconds to 15 minutes, or in the alternative, the time can be in the range of from 15 minutes to 30 minutes.

EXAMPLES

The following examples illustrate the present invention but are not intended to limit the scope of the invention.
Resin Description:

Resin A (DOWLEX NG 2045B, commercially available from The Dow Chemical Company) is a Ziegler-Natta catalyzed polyethylene resin made in a solution process having melt index of 1.0 g/10 min (at 190° C., 2.16 kg ASTM D-1238) and a density 0.920 g/cm$^3$ (ASTM D792), which is commercially available from The Dow Chemical Company.

Resin B (LDPE 219M—commercially available from The Dow Chemical Company) is a homopolymer ethylene resin made in a high-pressure tubular reactor having a melt index of 2.0 g/10 min (at 190° C., 2.16 kg ASTM D-1238) and a density of 0.922 g/cm$^3$ (ASTM D792).

Comparative Example 1 was Resin A (DOWLEX NG 2045B) in the absence of any peroxide.

Comparative Example 2 was Resin A (DOWLEX NG 2045B) compounded with a masterbatch so that the final resin contained 98 wt % DOWLEX NG 2045B and 2 wt % of the masterbatch which comprised Resin B and 2,500 ppm CGX CR 946 so that the final resin comprised 50 ppm CGX CR 946, an alkoxyamine derivative which is commercially available from BASF.

Inventive Example 1 was Resin A (DOWLEX NG 2045B) compounded with a masterbatch which comprised an Resin B and 683 ppm TRIGONOX 311 so that the final resin contained 97.5 wt % DOWLEX NG 2045B and 2.5 wt % of the masterbatch. The final resin thus contained 14 ppm TRIGONOX 311. TRIGONOX 311 is 3,3,5,7,7-pentamethyl-1,2,4 trioxepane, which has a 1 hour half-life decomposition temperature of 166° C. when measured in chlorobenzene, as described in "Initiators and Reactor Additives for Thermoplastics available at http://www.akzonobel.com/polymer/system/images/AkzoNobel_Initiators_and_Reactor_Additives_for_Thermoplastics_Low-res_protected_July%202010_tcm96-39468.pdf. The method for determining peroxide 1 hour half-life decomposition temperature is described below. TRIGONOX 311 is commercially available from AkzoNobel Polymer Chemicals.

Inventive Example 2 was Resin A (DOWLEX NG 2045B) compounded with a masterbatch which comprised Resin B and 683 ppm TRIGONOX 311 so that the final resin contained 96.3 wt % DOWLEX NG 2045B and 3.7 wt % of the masterbatch. The final resin thus contained 20 ppm TRIGONOX 311.

Each of Comparative Examples 1 and 2 and Inventive Examples 1 and 2 further contained the IRGAFOS 168 additives as shown in Tables 1 and 2, respectively. IRGAFOS 168 is tris(2,4-ditert-butylphenyl)phosphite, which is commercially available from BASF.

Two masterbatches were prepared with Resin B as the carrier resin and either a) 2,500 ppm of CGX CR 946 (for Comparative Examples) or b) 683 ppm of TRIGONOX 311 (for Inventive Examples). Resin B and either CGX CR 946 or TRIGONOX 311 were compounded in a 30 mm co-rotating, intermeshing Coperion Werner-Pfleiderer ZSK-30 (ZSK-30) twin screw extruder to form a masterbatch. The ZSK-30 has ten barrel sections with an overall length of 960 mm and a 32 length to diameter ratio (L/D). A two-hole strand die was used without a breaker plate or screen pack. The extruder consisted of a DC motor, connected to a gear box by V-belts. The 15 Hp motor was powered by a GE adjustable speed drive located in a control cabinet. The control range of the screw shaft speed was 1:10. The maximum screw shaft speed was 500 revolutions per minute. A pressure transducer was positioned in front of the die to measure die pressure.

The extruder had eight heated/cooled barrel sections along with a 30 mm spacer, which made up five temperature controlled zones. It had a cooled only feed section and a heated only die section, which was held together by tie-rods and supported on the machine frame. Each section could be heated electrically with angular half-shell heaters and cooled by a special system of cooling channels.

The screws consisted of continuous shafts on which screw-flighted components and special kneading elements were installed. The elements were held together radially by keys and keyways and axially by a screwed-in screw tip. The screw shafts were connected to the gear-shafts by couplings and could easily be pulled out of the screw barrel for dismantling.

A Conair pelletizer which is a 220 volt variable speed, solid cutter unit was used to pelletize the blends. The variable speed motor drove a solid machined cutting wheel, which in turn drove a fixed metal roller. A movable rubber roller pressed against the fixed roller and helps pull the strands by friction into the cutting wheel. The tension on the movable roller may be adjusted as necessary.

The temperatures were set in the feed zone, 4 zones in the extruder, and the die as:
Feed: 80° C.
Zone 1: 160° C.
Zone 2: 180° C.
Zone 3: 185° C.
Zone 4: 190° C.
Die: 210° C.

The screw shaft speed was set at 275 revolutions per minute (RPM), resulting in an output rate of 52 lb/hr.

The appropriate masterbatch material was blended with Resin A using the following setup: the masterbatch was fed through a hopper into a Sterling 2½ inch single screw extruder which was used as the side arm conveyer with a rupture disc of 3200 psig. The four heating zones in the single screw extruder were set at 220° C.

Resin A was fed through another hopper into a Century-ZSK-40 extruder (37.13 length-to-diameter ratio extruder, a co-rotating, intermeshing, 40 mm twin screw extruder with 150 Hp drive, 244 Armature amps (maximum), and 1200 screw rpm (maximum)). The nine heating zones in the extruder were set as follows: the first at 25° C., the second at 100° C., and the rest at 200° C.

The polymer melt pump was a Maag 100 cc/revolution pump that conveyed the molten polymer from the extruder, and through the downstream equipment. It was powered by a 15 hp motor with a 20.55/1 reduction gear. The pump was equipped with a pressure transmitter and a 5200 psi rupture disc on the inlet and outlet transition piece. There were heater zones on the melt pump and the inlet and outlet transition pieces which were set at 220° C.

The melt pump was attached to the extruder and the single screw extruder's flow enters the polymer stream through an injector from the single screw side arm extruder. The injector was a ¾ of an inch tubing protruding into the centerline of a pipe attached to the melt pump with a 3.1 inches internal diameter.

The polymer coming from the extruder was blended with the single screw extruder resin as it flowed through a static mixer with 18 Kenics mixing elements inside a pipe of 3.1 inch internal diameter. The mixing elements had a 1.3 length-to-diameter ratio. There were seven heating zones in the static mixer and were all set to 220° C.

The combined flow then flowed through a Gala pelletizer system. The Gala was equipped with a 12 hole (2.36 mm diameter holes) Gala die with four of the holes plugged. The cutter had a four blade hub and operates at approximately 800 ppm. The water temperature in the pelletizer was kept at 30° C.

The residence time of the masterbatch in the side arm extruder was approximately 20 minutes and the residence time of the polymer in the static mixer was approximately 3 minutes.

Test Methods

Test methods include the following:
Density of the resins was measured according to ASTM D792.

Melt Index, $I_2$, was measured according to ASTM D1238 (2.16 kg, 190° C.). Melt index, $I_{10}$, was measured according to ASTM D1238 (10 kg, 190° C.).

Melt strength measurements were conducted on a Gottfert Rheotens 71.97 (Göettfert Inc.; Rock Hill, S.C.), attached to a Gottfert Rheotester 2000 capillary rheometer. The melted sample (about 25 to 30 grams) was fed with a Göettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips, located 100 mm below the die, with an acceleration of 2.4 mm/s². The tensile force was recorded as a function of the take-up speed of the nip rolls. Melt strength was reported as the plateau force (cN) before the strand broke. The following conditions were used in the melt strength measurements: plunger speed=0.265 mm/second; wheel acceleration=2.4 mm/s²; capillary diameter=2.0 mm; capillary length=30 mm; and barrel diameter=12 mm. Vinyl unsaturations were measured according to ASTM D-6248-98.

Molecular Weight Distribution

The molecular weight distributions of the ethylene polymers were determined by gel permeation chromatography (GPC). The chromatographic system consisted of a Waters (Millford, Mass.) 150° C. high temperature gel permeation chromatograph, equipped with a Precision Detectors (Amherst, Mass.) 2-angle laser light scattering detector Model 2040. The 15° angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories. The carousel compartment was operated at 140° C. and the column compartment was operated at 150° C. The columns used were four Shodex HT 806M 300 mm, 13 μm columns and one Shodex HT803M 150 mm, 12 μm column. The solvent used was 1,2,4 trichlorobenzene. The samples were prepared at a concentration of 0.1 grams of polymer in 50 milliliters of solvent. The chromatographic solvent and the sample preparation solvent contained 200 μg/g of butylated hydroxytoluene (BHT). Both solvent sources were nitrogen sparged. Polyethylene samples were stirred gently at 160° C. for 4 hours. The injection volume used was 200 microliters, and the flow rate was 0.67 milliliters/min. Calibration of the GPC column set was performed with 21 narrow molecular weight distribution polystyrene standards, with molecular weights ranging from 580 to 8,400,000 g/mol, which were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to, or greater than, 1,000,000 g/mol, and 0.05 grams in 50 milliliters of solvent for molecular weights less than 1,000,000 g/mol. The polystyrene standards were dissolved at 80° C. with gentle agitation for 30 minutes. The narrow standards mixtures were run first, and in order of decreasing highest molecular weight component, to minimize degradation. The polystyrene standard peak molecular weights were converted to polyethylene molecular weights using the following equation (as described in Williams and Ward, *J. Polym. Sci., Polym. Let.,* 6, 621 (1968)):

$$M\text{polyethylene}=A\times(M\text{polystyrene})^B,$$

where M is the molecular weight, A has a value of 0.41 and B is equal to 1.0. The Systematic Approach for the determination of multi-detector offsets was done in a manner consistent with that published by Balke, Mourey, et al. (Mourey and Balke, *Chromatography Polym.* Chpt 12, (1992) and Balke, Thitiratsakul, Lew, Cheung, Mourey, *Chromatography Polym.* Chpt 13, (1992)), optimizing dual detector log results from Dow broad polystyrene 1683 to the narrow standard column calibration results from the narrow standards calibration curve using in-house software. The molecular weight data for off-set determination was obtained in a manner consistent with that published by Zimm (Zimm, B. H., *J. Chem. Phys.,* 16, 1099 (1948)) and Kratochvil (Kratochvil, P., *Classical Light Scattering from Polymer Solutions,* Elsevier, Oxford, N.Y. (1987)). The overall injected concentration used for the determination of the molecular weight was obtained from the sample refractive index area and the refractive index detector calibration from a linear polyethylene homopolymer of 115,000 g/mol molecular weight, which was measured in reference to NIST polyethylene homopolymer standard 1475. The chromatographic concentrations were assumed low enough to eliminate addressing $2^{nd}$ Virial coefficient effects (concentration effects on molecular weight). Molecular weight calculations were performed using in-house software. The calculation of the number-average molecular weight, weight-average molecular weight, and z-average molecular weight were made according to the following equations, assuming that the refractometer signal is directly proportional to weight fraction. The baseline-subtracted refractometer signal can be directly substituted for weight fraction in the equations below. Note that the molecular weight can be from the conventional calibration curve or the absolute molecular weight from the light scattering to refractometer ratio. An improved estimation of z-average molecular weight, the baseline-subtracted light scattering signal can be substituted for the product of weight average molecular weight and weight fraction in equation (2) below:

$$a) \overline{Mn} = \frac{\sum_{i} Wf_i}{\sum_{i} (Wf_i/M_i)}$$

$$b) \overline{Mw} = \frac{\sum_{i} (Wf_i * M_i)}{\sum_{i} Wf_i}$$

$$c) \overline{Mz} = \frac{\sum_{i} (Wf_i * M_i^2)}{\sum_{i} (Wf_i * M_i)} \quad (2)$$

Monomodal distribution was characterized according to the weight fraction of the highest temperature peak in temperature rising elution fractionation (typically abbreviated as "TREF") data as described, for example, in Wild et al., *Journal of Polymer Science, Poly. Phys. Ed.*, Vol. 20, p. 441 (1982), in U.S. Pat. No. 4,798,081 (Hazlitt et al.), or in U.S. Pat. No. 5,089,321 (Chum et al.), the disclosures of all of which are incorporated herein by reference. In analytical temperature rising elution fractionation analysis (as described in U.S. Pat. No. 4,798,081 and abbreviated herein as "ATREF"), the composition to be analyzed is dissolved in a suitable hot solvent (for example, 1,2,4 trichlorobenzene), and allowed to crystallized in a column containing an inert support (for example, stainless steel shot) by slowly reducing the temperature. The column was equipped with both an infra-red detector and a differential viscometer (DV) detector. An ATREF-DV chromatogram curve was then generated by eluting the crystallized polymer sample from the column by slowly increasing the temperature of the eluting solvent (1,2,4 trichlorobenzene). The ATREF-DV method is described in further detail in WO 99/14271, the disclosure of which is incorporated herein by reference.

Dynamic Mechanical Spectroscopy (DMS): Resins were compression-molded into "3 mm thick×1 inch" circular plaques at 350° F., for five minutes, under 1500 psi pressure, in air. The sample was then taken out of the press, and placed on a counter to cool. A constant temperature frequency sweep was performed using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of "2 mm," the sample trimmed (extra sample that extends beyond the circumference of the "25 mm diameter" plate was removed), and then the test was started. The method had an additional five minute delay built in, to allow for temperature equilibrium. The experiments were performed at 190° C. over a frequency range of 0.1 to 100 rad/s. The strain amplitude was constant at 10%. The complex viscosity η*, tan (δ) or tan delta, viscosity at 0.1 rad/s (V0.1), the viscosity at 100 rad/s (V100), and the viscosity ratio (V0.1/V100) were calculated from these data.

Differential Scanning calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (about 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), heat of fusion ($H_f$) (in Joules per gram), and the calculated % crystallinity for polyethylene samples using: % Crystallinity=(($H_f$)/(292 J/g))×100.

The heat of fusion ($H_f$) and the peak melting temperature are reported from the second heat curve. Peak crystallization temperature is determined from the cooling curve.

Peroxide 1 hour half-life decomposition temperature is determined by differential scanning calorimetry-thermal activity monitoring (DSC-TAM) of a dilute solution of the initiator in monochlorobenzene. Kinetic data of the decomposition of hydroperoxides in monochlorobenzene are determined titrimetrically. The half-life can be calculated by the Arrhenius equation:

$k_d = A \cdot e^{-Ea/RT}$ and $t_{1/2} = \ln 2/k_d$, where $k_d$ is the rate constant for initiator dissociation in s$^{-1}$; A is the Arrhenius frequency factor in s$^{-1}$; Ea is the activation energy for the initiator dissociation in J/mole; R is 8.3142 J/mole K; T is temperature in K (Kelvin); and $t_{1/2}$ is half-life in seconds(s).

GI 200 gel measurement is described in U.S. Patent Application Publication No. 20120129417, the disclosure of which is incorporated herein by reference. GI stands for "gel index". GI200 includes all gels equal to or greater than 200 microns in diameter.

Determination of Irganox 1010, Irganox 1076, Irgafos 168 and oxidized Irgafos 168 in polyethylene was performed using total dissolution methodology (TDM). This methodology involves dissolution of 1 g of solid in 25 mL of o-xylene at 130° C. for 30 min followed by precipitation with cooling and the addition of 50 mL of methanol. After the precipitation, the extract was filtered using a syringe filter into an autosampler vial for analysis by reversed phase liquid chromatography using the conditions summarized below:

Column: Zorbax Eclipse XDB-C8, 5 μm particle, 4.6×12.5 mm guard coupled to a Zorbax, Eclipse XDB-C8, 3.5 μm particle, 4.6×50 mm column using an Agilent guard column kit;
Column Oven: 50° C.;
Detection: UV absorbance at 210 nm
Gradient: Solvent A: 50/50 water/acetonitrile and Solvent B: acetonitrile

| Time (min) | Flow (mL/min) | % A | % B |
|---|---|---|---|
| 0.0 | 1.9 | 50 | 50 |
| 2.00 | 1.9 | 0 | 100 |
| 6.00 | 1.9 | 0 | 100 |

Data acquisition time: 8 min;
Post Run Time: 2 min at 50/50 AB;
Total run time: 10 min with equilibration time;
Injection: 10 μL; and
Data System: Agilent EZChrom Elite The concentration of the components were calculated using an external standard calibration procedure.

Tables

TABLE 1

|  | Comp. Ex. 1 | Comp. Ex. 2 |
|---|---|---|
| $I_2$ | 0.98 | 0.89 |
| $I_{10}/I_2$ | 7.55 | 7.80 |
| Density (g/cm$^3$) | 0.9202 | 0.9211 |
| Melt Strength (cN) | 3.1 | 4.2 |
| Active IRGAFOS 168 (ppm) | 916 | 986 |
| Oxidized IRGAFOS 168 (ppm) | 48 | 281 |
| Total IRGAFOS 168 (ppm) | 964 | 1,267 |
| Gels GI 200 | 6.14 | 34.19 |
| Viscosity at 0.1 rad/s (Pa-s) | 8,537 | 9,503 |
| Viscosity at 1 rad/s (Pa-s) | 6,965 | 7,321 |
| Viscosity at 10 rad/s (Pa-s) | 4,291 | 4,337 |
| Viscosity at 100 rad/s (Pa-s) | 1,732 | 1,718 |
| Viscosity at 0.1/100 rad/s | 4.93 | 5.53 |
| Tan Delta at 0.1 rad/s | 10.91 | 7.77 |
| G* (Pa) at 0.1 rad/s | 854 | 950 |
| G* (Pa) at 1 rad/s | 6,965 | 7,321 |
| G* (Pa) at 10 rad/s | 42,909 | 43,368 |
| G* (Pa) at 100 rad/s | 173,000 | 172,000 |
| Phase Angle (Degrees) at 0.1 rad/s | 84.76 | 82.67 |
| Phase Angle (Degrees) at 1 rad/s | 76.59 | 74.68 |
| Phase Angle (Degrees) at 10 rad/s | 63.12 | 62.03 |
| Phase Angle (Degrees) at 100 rad/s | 47.11 | 46.62 |
| Mw (g/mol) | 121,461 | 118,492 |
| Mn (g/mol) | 30,976 | 31,887 |
| Mz (g/mol) | 347,693 | 326,473 |
| Mw/Mn | 3.92 | 3.72 |
| Melting Temperature Tm (° C.) | 124.3 | 122.7 |
| Heat of Fusion (J/g) | 142.6 | 147.4 |
| % Crystallinity | 48.8 | 50.5 |
| Crystallization Temperature Tc (° C.) | 107.1 | 110.1 |

TABLE 2

|  | Inv. Ex. 1 | Inv. Ex. 2 |
|---|---|---|
| $I_2$ | 0.90 | 0.83 |
| $I_{10}/I_2$ | 7.98 | 8.17 |
| Density (g/cm$^3$) | 0.9204 | 0.9208 |
| Melt Strength (cN) | 5.0 | 5.8 |
| Active IRGAFOS 168 (ppm) | 708.9 | 693.4 |
| Oxidized IRGAFOS 168 (ppm) | 241.6 | 237.4 |
| Total IRGAFOS 168 (ppm) | 950.5 | 930.8 |
| Gels GI 200 | 39.83 | 19.99 |
| Viscosity at 0.1 rad/s (Pa-s) | 9,675 | 10,729 |
| Viscosity at 1 rad/s (Pa-s) | 7,413 | 7,820 |
| Viscosity at 10 rad/s (Pa-s) | 4,364 | 4,434 |
| Viscosity at 100 rad/s (Pa-s) | 1,722 | 1,719 |
| Viscosity at 0.1/100 rad/s | 5.62 | 6.24 |
| Tan Delta at 0.1 rad/s | 7.53 | 6.06 |
| G* (Pa) at 0.1 rad/s | 967 | 1,073 |
| G* (Pa) at 1 rad/s | 7,413 | 7,820 |
| G* (Pa) at 10 rad/s | 43,642 | 44,339 |
| G* (Pa) at 100 rad/s | 172,000 | 172,000 |
| Phase Angle (Degrees) at 0.1 rad/s | 82.44 | 80.63 |
| Phase Angle (Degrees) at 1 rad/s | 74.41 | 72.66 |
| Phase Angle (Degrees) at 10 rad/s | 61.78 | 60.74 |
| Phase Angle (Degrees) at 100 rad/s | 46.52 | 46.04 |
| Mw (g/mol) | 120,129 | 119,830 |
| Mn (g/mol) | 29,292 | 31,122 |
| Mz (g/mol) | 350,315 | 337,810 |
| Mw/Mn | 4.10 | 3.85 |
| Melting Temperature Tm (° C.) | 122.7 | 122.6 |
| Heat of Fusion (J/g) | 147.8 | 147.7 |
| % Crystallinity | 50.6 | 50.6 |
| Crystallization Temperature Tc (° C.) | 110.6 | 110.1 |

The present invention may be embodied in other forms without departing from the spirit and the essential attributes thereof, and, accordingly, reference should be made to the appended claims, rather than to the foregoing specification, as indicating the scope of the invention.

We claim:

1. A method for increasing the melt strength of a polyethylene resin comprising:
   a) selecting up to 99 percent by weight of a polyethylene resin having
      i) a density, as determined according to ASTM D792, in the range of from 0.865 g/cm$^3$ to 0.97 g/cm$^3$, and
      ii) a melt index, $I_2$, as determined according to ASTM D1238 (2.16 kg, 190° C.), in the range of from 0.01 g/10 min to 100 g/10 min;
   b) reacting from 10 ppm to 75 ppm of at least one peroxide having a 1 hour half-life decomposition temperature from 160° C. to 250° C. with the polyethylene resin,
   wherein the peroxide is added to the polyethylene resin as from 1 to 5 percent by weight of a masterbatch comprising the peroxide along with a carrier resin, and wherein the carrier resin is selected from polyethylenes having a vinyl concentration from 0.07 to 0.7 per 1,000 carbons in the backbone of the polymer, and wherein said at least one peroxide is 3,3,5,7,7-pentamethyl-1,2,4 trioxepane, and wherein the polymeric resin exhibits an increase in melt strength at 100 mm/sec which is at least 20% greater than the melt strength of the polyethylene resin in the absence of the masterbatch.

2. The method according to claim 1, wherein the ratio of $I_2$ of the polyethylene resin to the $I_2$ of the carrier resin is from 0.2 to 5.

3. The method according to claim 1, wherein the peroxide is present in amounts from 14 to 20 ppm.

4. A polymeric composition comprising:
   from 1 to 5 wt % of a masterbatch comprising a carrier resin and from 1000 ppm to 10000 ppm of at least one peroxide having a 1 hr. half-life decomposition temperature from 160° C. to 250° C.;
   up to 99 wt % polyethylene resin having
      a density, as determined according to ASTM D792, in the range of from 0.865 g/cm$^3$ to 0.97 g/cm$^3$, and
      a melt index, $I_2$, as determined according to ASTM D1238 (2.16 kg, 190° C.), in the range of from 0.01 g/10 min to 100 g/10 min; and
      a vinyl concentration from 0.07 to 0.7 per 1,000; and
   wherein the polymeric composition comprises from 10 to 75 ppm said at least one peroxide, wherein said at least one peroxide is 3,3,5,7,7-pentamethyl-1,2,4 trioxepane; wherein the polymeric composition exhibits an increase in melt strength at 100 mm/sec which is at least 20% greater than the melt strength of the polyethylene resin in the absence of the masterbatch.

* * * * *